United States Patent
Adachi et al.

(10) Patent No.: US 10,511,052 B2
(45) Date of Patent: Dec. 17, 2019

(54) ELECTROLYTE SHEET

(71) Applicant: IDEMITSU KOSAN CO., LTD., Tokyo (JP)

(72) Inventors: Hitomi Adachi, Sodegaura (JP); Hiroyuki Tamura, Sodegaura (JP); Toshiaki Tsuno, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 1072 days.

(21) Appl. No.: 14/361,976

(22) PCT Filed: Nov. 28, 2012

(86) PCT No.: PCT/JP2012/007638
§ 371 (c)(1),
(2) Date: May 30, 2014

(87) PCT Pub. No.: WO2013/080540
PCT Pub. Date: Jun. 6, 2013

(65) Prior Publication Data
US 2015/0132638 A1 May 14, 2015

(30) Foreign Application Priority Data
Nov. 30, 2011 (JP) .................... 2011-261621

(51) Int. Cl.
*H01M 10/056* (2010.01)
*H01M 10/052* (2010.01)

(52) U.S. Cl.
CPC ....... *H01M 10/056* (2013.01); *H01M 10/052* (2013.01); *H01M 2300/0068* (2013.01);
(Continued)

(58) Field of Classification Search
CPC ............. H01M 10/052; H01M 10/056; H01M 2300/0068; H01M 2300/0091; H01M 2300/0094
See application file for complete search history.

(56) References Cited

U.S. PATENT DOCUMENTS

2003/0194607 A1* 10/2003 Huang ................ H01M 4/5815
429/176
2005/0107239 A1* 5/2005 Akiba ................ C03B 19/1005
501/40
(Continued)

FOREIGN PATENT DOCUMENTS

CN 101040401 A 9/2007
JP 2001-273928 A 10/2001
(Continued)

OTHER PUBLICATIONS

Japanese Office Action dated Aug. 18, 2015 in Patent Application No. 2011-261621 (without English Translation).
(Continued)

*Primary Examiner* — Adam A Arciero
(74) *Attorney, Agent, or Firm* — Oblon, McClelland, Maier & Neustadt, L.L.P.

(57) ABSTRACT

An electrolyte sheet including an electrolyte layer that includes electrolyte particles and a binder, and a base material stacked on the electrolyte layer, wherein the electrolyte particles have an ionic conductivity of $1.0 \times 10^{-5}$ S/cm or more; the ratio of the electrolyte particles relative to the total weight of the electrolyte particles and the binder is 50 wt % or more and 99.5 wt % or less; and, after transferring the electrolyte layer in a transfer test, the electrolyte particles and the binder do not remain on the base material, and the electrolyte layer is transferred to an object without peeling.

11 Claims, 1 Drawing Sheet

(a)    (b)

(52) U.S. Cl.
CPC ............... *H01M 2300/0091* (2013.01); *H01M 2300/0094* (2013.01); *Y02E 60/122* (2013.01); *Y02P 70/54* (2015.11)

(56) References Cited

U.S. PATENT DOCUMENTS

| | | | |
|---|---|---|---|
| 2005/0175894 A1* | 8/2005 | Visco | H01M 2/1673 429/212 |
| 2007/0160911 A1* | 7/2007 | Senga | C03C 4/18 429/322 |
| 2007/0231653 A1* | 10/2007 | Kim | H01M 8/1023 429/483 |
| 2007/0259271 A1 | 11/2007 | Nanno et al. | |
| 2008/0070086 A1* | 3/2008 | Fukuchi | H01B 1/122 429/482 |
| 2008/0268346 A1* | 10/2008 | Inda | H01M 4/131 429/322 |
| 2008/0274411 A1* | 11/2008 | Nakajima | H01M 10/0525 429/322 |
| 2010/0047691 A1* | 2/2010 | Kawakami et al. | H01M 4/00 |
| 2012/0009484 A1* | 1/2012 | Aburatani | C03C 1/02 429/322 |
| 2012/0226455 A1* | 9/2012 | Kumashiro | G01R 31/3624 702/63 |

FOREIGN PATENT DOCUMENTS

| | | |
|---|---|---|
| JP | 2006-86102 A | 3/2006 |
| JP | 2009-140920 A | 6/2009 |
| JP | 2010-33918 A | 2/2010 |
| JP | 2011-14387 A | 1/2011 |
| JP | 2011-181260 A | 9/2011 |
| WO | WO 2005/078740 A1 | 8/2005 |

OTHER PUBLICATIONS

International Search Report dated Jan. 8, 2013 in PCT/JP2012/007638.

International Preliminary Report on Patentability and Written Opinion dated Jun. 12, 2014 in PCT/JP2012/007638 (English Translation only).

Combined Chinese Office Action and Search Report dated Mar. 23, 2017 in Patent Application No. 201280059125.0 (with English Translation of Category of Cited Documents).

* cited by examiner

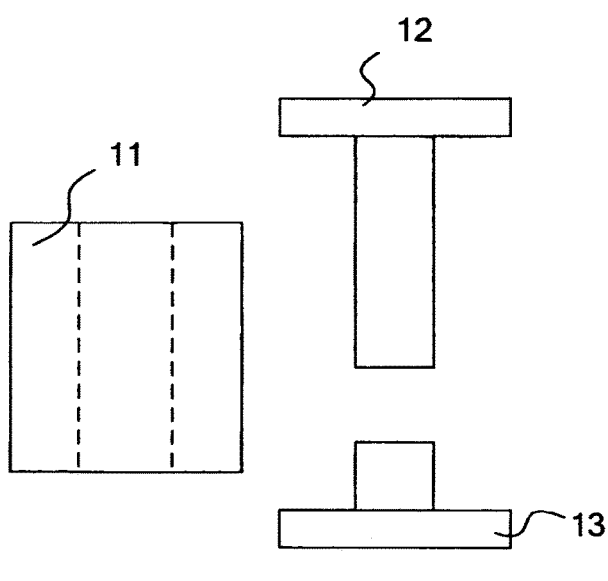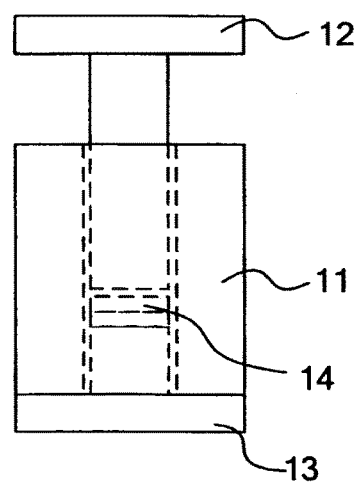
(a)            (b)

ELECTROLYTE SHEET

TECHNICAL FIELD

The invention relates to an electrolyte slurry and an electrolyte sheet used for the formation of an electrolyte layer.

BACKGROUND ART

In currently-available lithium ion batteries, an organic electrolyte solution is mainly used as an electrolyte. However, although the organic electrolyte solution shows a high ionic conductivity, since the electrolyte solution is a flammable liquid, there is a concern of occurrence of leakage, ignition or the like when used in a battery. Taking such concern into consideration, development of a solid electrolyte having a higher degree of safety is expected as an electrolyte for a next-generation lithium ion battery.

In order to solve the problem, a method for producing an all-solid lithium battery produced by using a sulfide-based solid electrolyte comprising a sulfur atom, a lithium atom and a phosphorous atom as main components has been developed (Patent Document 1).

The method for producing an all-solid lithium battery disclosed in Patent Document 1 has a defect that it is not suited to mass production since production is conducted by putting electrolyte particles in a mold, followed by pressure application.

In order to solve the subject, a technology has been studied in which a slurry obtained by mixing electrolyte particles and a binder is applied to form an electrolyte layer. In this technology, normally, a positive electrode layer or a negative electrode layer is produced by a coating method, an electrolyte layer is formed on the positive electrode layer or the negative electrode layer by a coating method, and further, a positive electrode layer or a negative electrode layer on the electrolyte layer. However, this technology has a defect that it is difficult to form by coating the electrolyte layer on the electrodes that are produced by a coating method.

RELATED ART DOCUMENTS

Patent Documents

Patent Document 1: JP-A-2001-273928

SUMMARY OF THE INVENTION

An object of the invention is to provide a technology of forming easily an electrolyte layer in the production of a battery.

According to the invention, the following electrolyte sheet or the like are provided.
1. An electrolyte sheet comprising an electrolyte layer that comprises electrolyte particles and a binder, and a base material stacked on the electrolyte layer,
wherein
the electrolyte particles have an ionic conductivity of $1.0 \times 10^{-5}$ S/cm or more;
the ratio of the electrolyte particles relative to the total weight of the electrolyte particles and the binder is 50 wt % or more and 99.5 wt % or less; and,
after transferring the electrolyte layer in the following transfer test, the electrolyte particles and the binder do not remain on the base material, and the electrolyte layer is transferred to an object without peeling;
[Transfer Test]
(A) Positive Electrode Sheet as an Object
a positive electrode slurry is applied to a 20 μm-thick aluminum sheet, dried on a hot plate at 80° C. for 10 minutes, and further subjected to vacuum drying at 80° C. for 4 hours to produce a positive electrode sheet including a positive electrode layer having a thickness of 100 μm (a stacked body of a positive electrode layer and aluminum);
the positive electrode slurry is obtained by mixing the following positive active material, electrode particles, binder and solvent at a weight ratio of 19:19:2:60;
Positive Electrode Active Material
a positive electrode active material is produced by a method in which 0.400 g of sulfur (manufactured by Sigma-Aldrich Japan) and 0.400 g of porous carbon (ketjenblack (KB) EC600JD, manufactured by Lion Corporation) are mixed in a mortar, the mixture is put in a sealable stainless-made container, and then subjected to a heat treatment in an electric furnace (heating is conducted as follows: heated at a heating rate of 10° C./min from room temperature to 150° C., retained at 150° C. for 6 hours, further heated to 300° C. at a heating rate of 10° C./min, retained for 2.75 hours, and naturally cooled);
Electrolyte Particles
electrolyte particles are produced by the same method as mentioned in Example 1 of WO2005/078740;
Binder
as a binder, Kynar2500-20 manufactured by Arkema Inc. is used; and
Solvent
as a solvent, isobutylnitrile manufactured by Tokyo Chemical Industry Co. Ltd. is used;
(B) Transfer Test
an electrolyte sheet as a test sample is formed into a cylindrical shape having a radius of 16.5 mm by means of a punch; similarly, the positive electrode sheet is formed into a cylindrical shape having a radius of 16.5 mm by means of a punch;
the electrolyte sheet and the positive electrode sheet are overlapped such that the electrolyte layer and the positive electrode layer are in contact with each other and then inserted into a cylindrical middle mold; and
the sheets are sandwiched between an upper mold and a lower mold and a pressure of 270 MPa is applied for 10 seconds to the entire sample; after application of a pressure, the electrolyte sheet and the positive electrode sheet that have been integrated are taken out from the mold; and the base material for the electrolyte sheet is peeled off; and a peeling surface and a connection surface of the electrolyte layer and the positive electrode layer are visually observed.
2. The electrolyte sheet according to 1, wherein the electrolyte particles have a composition represented by the formula (1):

$$Li_a M_b P_c S_d \qquad (1)$$

wherein in the formula (1), M is an element selected from B, Zn, Si, Cu, Ga and Ge; and
a, b, c and d are a composition ratio of each element, and satisfy a:b:c:d of 1 to 12:0 to 0.2:1:2 to 9.
3. The electrolyte sheet according to 1 or 2, wherein the binder is a resin comprising the following structural unit A in the molecular skeleton:

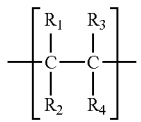
(A)

wherein in the formula, $R_1$ to $R_4$ are independently H, F, $CF_3$, $CH_2CF_3$, $CF_2CF_3$, $CF_2CF_2CF_3$, $OCF_2CF_2CF_3$, $OCF_3$ or Cl, and at least one of $R_1$ to $R_4$ is F, $CF_3$, $CH_2CF_3$, $CF_2CF_3$, $CF_2CF_2CF_3$, $OCF_2CF_2CF_3$ or $OCF_3$.

4. The electrolyte sheet according to any one of 1 to 3, wherein the ionic conductivity of the electrolyte layer is $1.0 \times 10^{-6}$ S/cm or more.

5. The electrolyte sheet according to any one of 1 to 4, wherein the peel force of the base material is 20 mN/cm or more and 1500 mN/cm or less.

6. A battery comprising an electrolyte layer of the electrolyte sheet according to any one of 1 to 5.

7. An apparatus comprising the battery according to 6.

8. An electrolyte slurry comprising electrolyte particles, a binder and a solvent,
the electrolyte particles having an ionic conductivity of $1.0 \times 10^{-5}$ S/cm or more,
the average particle size ($D_{50}$) of the electrolyte particles being 5 nm or more and 50 μm or less;
the solid matter concentration of the slurry being 20 wt % or more and 90 wt % or less; and
the ratio of the electrolyte particles in the solid matter being 50 wt % or more and 99.5 wt % or less;
wherein
after the transferring an electrolyte layer in a transfer test of the electrolyte sheet comprising the electrolyte layer that is formed by using the slurry and the base material, the electrolyte particles and the binder do not remain on the base material, and the electrolyte layer is transferred to an object without peeling.

9. The electrolyte slurry according to 8, wherein the electrolyte particles have a composition represented by the formula (1):

$$Li_a M_b P_c S_d \quad (1)$$

wherein in the formula (1), M is an element selected from B, Zn, Si, Cu, Ga and Ge; and
a, b, c and d are a composition ratio of each element, and satisfy a:b:c:d of 1 to 12:0 to 0.2:1:2 to 9.

10. The electrolyte slurry according to 8 or 9, wherein the binder is a resin comprising the following structural unit A in the molecular skeleton:

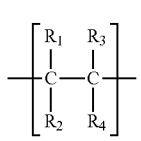
(A)

wherein in the formula, $R_1$ to $R_4$ are independently H, F, $CF_3$, $CH_2CF_3$, $CF_2CF_3$, $CF_2CF_2CF_3$, $OCF_2CF_2CF_3$, $OCF_3$ or Cl, and at least one of $R_1$ to $R_4$ is F, $CF_3$, $CH_2CF_3$, $CF_2CF_3$, $CF_2CF_2CF_3$, $OCF_2CF_2CF_3$ or $OCF_3$.

11. A method for producing a stacked body comprising an electrode material layer and an electrolyte layer comprising:
applying an electrolyte slurry comprising electrolyte particles having a composition represented by the following formula (1) and a binder that is a resin having the following structural unit A in the molecular skeleton to a base material, thereby to form an electrolyte layer; and
transferring the electrolyte layer to an electrode material layer and peeling off the base material from the electrolyte layer,
wherein
the electrolyte slurry has a solid matter concentration of 20 wt % or more and 90 wt % or less;
the ratio of the electrolyte particles in the solid matter is 50 wt % or more and 99.5 wt % or less; and
the peel force of the base material is 20 mN/cm or more and 1500 mN/cm or less:

$$Li_a M_b P_c S_d \quad (1)$$

wherein in the formula (1), M is an element selected from B, Zn, Si, Cu, Ga and Ge; and
a, b, c and d are a composition ratio of each element, and satisfy a:b:c:d of 1 to 12:0 to 0.2:1:2 to 9:

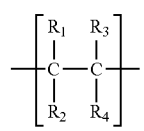
(A)

wherein in the formula, $R_1$ to $R_4$ are independently H, F, $CF_3$, $CH_2CF_3$, $CF_2CF_3$, $CF_2CF_2CF_3$, $OCF_2CF_2CF_3$, $OCF_3$ or Cl, and at least one of $R_1$ to $R_4$ is F, $CF_3$, $CH_2CF_3$, $CF_2CF_3$, $CF_2CF_2CF_3$, $OCF_2CF_2CF_3$ or $OCF_3$.

12. The method for producing the stacked body according to 11, wherein the structural unit A is a structure derived from vinylidene fluoride, a structure derived from tetrafluoroethylene or a structure derived from hexafluoropropylene.

13. The method for producing the stacked body according to 11 or 12, wherein the average particle diameter ($D_{50}$) of the electrolyte particles is 5 nm or more and 50 μm or less.

According to the invention, an electrolyte layer can be formed easily in the production of a battery.

BRIEF DESCRIPTION OF THE DRAWINGS

FIG. 1 is a schematic view of a mold used in a peeling transfer test, in which (a) is a side view of each mold, and (b) is a side view showing the state of use.

MODE FOR CARRYING OUT OF THE INVENTION

The electrolyte sheet of the invention comprises an electrolyte sheet comprising electrolyte particles and a binder and a base material stacked on this electrolyte layer. The electrolyte layer is stacked on the base material without being intervened by other layers. The electrolyte sheet of the invention can be preferably used as a sheet for transferring the electrolyte layer to an object (a positive electrode layer, or the like).

The electrode sheet of the invention can be produced by using the electrolyte slurry of the invention, for example.

Hereinbelow, an explanation will be made on the constituent components of the electrolyte sheet and the electrolyte slurry of the invention.

1. Electrolyte Layer (1) Electrolyte Particles

The electrolyte particles used in the invention have an ionic conductivity of $1.0 \times 10^{-5}$ S/cm or more. If the ionic conductivity is $1.0 \times 10^{-5}$ S/cm or more, a battery formed by using the resulting electrolyte sheet functions as a battery. The ionic conductivity is preferably $5.0 \times 10^{-5}$ S/cm or more, and more preferably $1 \times 10^{-4}$ S/cm or more. As an increase in ionic conductivity, the resistance of an electrolyte layer becomes low, whereby the performance of the battery comprising this electrolyte layer can be enhanced.

Although no specific restrictions are imposed on the upper limit, the upper limit is normally $1 \times 10^{-1}$ S/cm or less.

In the invention, the ionic conductivity is measured by the following method.

0.3 g of the electrolyte particles is weighed. Then, the particles are put in a mold shown in FIG. 1, and then flattened. A pressure of 185 MPa is applied from the upper surface to the electrolyte particles. After pressure application, in the upper and lower sides of the sample, 1.0 mg of SFG-15 manufactured by TIMCAl Inc. was put. A pressure of 185 MPa is applied again, whereby a battery for measuring the ionic conductivity in which an electrode is provided in each of the upper and lower sides of a container is produced. The ionic conductivity of the thus obtained battery is measured by means of an impedance apparatus manufactured by Toyo Corporation under conditions of a temperature of 25° C., an AC amplitude modulation of 10 mV and a frequency of 10M to 10 Hz.

The shape of the electrolyte particles is particulate. It is preferred that the average particle size of the electrolyte particles be 5 nm or more and 50 μm or less, more preferably 10 nm or more and 10 μm or less. If the average particle size is less than 5 nm, a large amount of a solvent is required for allowing the electrolyte particles to be in the form of a slurry. Therefore, the concentration of the solid matters in the slurry is lowered and hence, a required film thickness may not be obtained. If the average particle diameter exceeds 50 μm, the electrolyte particles tend to sediment in the slurry. In addition, if the electrolyte particles are formed into a film, the surface roughness becomes large, and as a result, transfer may not be conducted uniformly.

In the invention, the average particle diameter ($D_{50}$) of the electrolyte particles means a Mean Volume Diameter. As the method for measuring the $D_{50}$, a laser diffraction particle size analyzing method is preferable.

In the invention, the average particle size is measured by using dry electrolyte particles.

An example of the measurement when the laser diffraction particle analyzer is a Mastersizer 2000 manufactured by Malvern Instruments Ltd. is as follows.

In a dispersion tank of the apparatus, 110 ml of toluene that has been dehydrated (product name: special grade, manufactured by Wako Pure Chemical Industries, Ltd.) was put, and further, as a dispersant, 6% of tertiary butyl alcohol (special grade, manufactured by Wako Pure Chemical Industries, Ltd.) is added.

The above-mentioned mixture is fully mixed, and electrolyte particles are added to measure the particle size. The amount of the electrolyte particles to be added is such that the laser scattering intensity corresponding to the particle density is within the predetermined range (10 to 20%) in an operation screen specified by the Mastersizer 2000. If the amount exceeds this range, multiple scattering occurs, and as a result, an accurate particle size distribution may not be obtained. In the Mastersizer 2000, the laser scattering intensity is indicated based on the amount of the electrolyte particles added. If this is smaller than this range, an SN ratio becomes poor, and as a result, an accurate measurement may not be conducted.

Although the optimum amount of electrolyte particles to be added varies depending on the kind of the electrolyte or the like, the optimum amount is about 0.01 g to 0.05 g.

As the electrolyte particles usable in the invention, polymer-based solid electrolytes, oxide-based solid electrolytes or sulfide-based solid electrolytes can be given.

Preferably, the electrolyte particles are oxide-based solid electrolytes or sulfide-based solid electrolytes, with sulfide-based solid electrolytes being more preferable.

No specific restrictions are imposed on the polymer-based solid electrolyte. As disclosed in JP-A-2010-262860, materials that are used as a polymer electrolyte such as a fluorine resin, polyethylene oxide, polyacrylonitrile, polyacrylate or derivatives or copolymers thereof can be used.

As the fluorine resin, a resin comprising vinylidene fluoride (VdF), hexafluoropropylene (HFP), tetrafluoroethylene (TFE) and resins comprising these derivatives or the like as structural units can be given. As specific examples, homopolymers such as vinylidene polyfluoride (PVdF), polyhexafluoropropylene (PHFP) and polytetrafluoroethylene (PTFE), secondary copolymers or tertiary copolymers such as a copolymer of VdF and HFP (hereinafter, this copolymer is referred to as "P(VdF-HFP)") can be given.

As an oxide-based solid electrolyte, LiN and LISICON; Thio-LISICONs; crystals having a Perovskite structure such as $La_{0.55}Li_{0.35}TiO_3$; $LiTi_2P_3O_{12}$ having a NASICON structure; and electrolytes obtained by further crystallizing these can be used.

As the sulfide-based solid electrolyte, one having the composition represented by the following formula (1) is preferable.

$$Li_a M_b P_c S_d \qquad (1)$$

In the formula (1), M is an element selected from B, Zn, Si, Cu, Ga and Ge.

a, b, c and d are a composition ratio of each element, and satisfy a:b:c:d of 1 to 12:0 to 0.2:1:2 to 9.

It is preferred that b be 0. The ratio of a, c and d (a:c:d) is more preferably 1 to 9:1:3 to 7, further preferably the ratio of a, c and d is 1.5 to 4:1:3.25 to 4.5.

The composition ratio of each element can be controlled by adjusting the amount of the raw material compound when the sulfide-based solid electrolyte is produced.

The sulfide-based solid electrolyte may be amorphous (glass) or crystallized (glass ceramics). Only part of the solid electrolyte may be crystallized. Here, if crystallized, there may be a case where the ionic conductivity thereof becomes higher than that of glass. In this case, it is preferred that it be crystallized.

As the crystal structure, for example, the $Li_7PS_6$ structure, the $Li_4P_2S_6$ structure, the $Li_3PS_4$ structure, the $Li_4SiS_4$ structure or the $Li_2SiS_3$ structure disclosed in JP-A-2002-109955 and the $Li_7P_3S_{11}$ structure disclosed in JP-A-2005-228570 or WO2007/066539 are preferable.

Here, the $Li_7P_3S_{11}$ structure has a peak, in the X-ray diffraction (CuKα:λ=1.5418 Å), at 2θ=17.8±0.3 deg, 18.2±0.3 deg, 19.8±0.3 deg, 21.8±0.3 deg, 23.8±0.3 deg, 25.9±0.3 deg, 29.5±0.3 deg and 30.0±0.3 deg.

The reason therefor is that, by the above crystal structure, the ionic conductivity becomes higher than the amorphous body.

The crystallized part of the sulfide-based solid electrolyte may comprise only one crystal structure or may comprise a plurality of crystal structures. As the crystal structure, the $Li_7P_3S_{11}$ structure is most preferable due to its high ionic conductivity.

The crystallization degree of the sulfide-based solid electrolyte (the crystallization degree of a crystal structure of which the ionic conductivity is higher than that of an amorphous body) is preferably 50% or more, more preferably 60% or more.

If the crystallization degree of the sulfide-based solid electrolyte is less than 50%, the effect of increasing the ionic conductivity by crystallization becomes less significant.

The degree of crystallization can be measured by means of an NMR spectrum apparatus. Specifically, the solid $^{31}$P-NMR spectrum of the sulfide-based solid electrolyte is measured, and for the resulting spectrum, the resonance line observed at 70 to 120 ppm is separated into a Gaussian curve by using nonlinear least-squares method, and the ratio of areas of each curve is obtained.

As for the method for producing a sulfide-based solid electrolyte, as the raw material for the sulfide-based solid electrolyte, $Li_2S$ (lithium sulfide), $P_2S_3$ (phosphorus trisulfide), $P_2S_5$ (phosphorous pentasulfide), $SiS_2$ (silicon sulfide), $Li_4SiO_4$ (lithium orthosilicate), $Al_2S_3$ (aluminum sulfate), a simple body of phosphor (P), a simple body of sulfur (S), silicon (Si), $GeS_2$ (germanium sulfide), $B_2S_3$ (arsenic trisulfide), $Li_3PO_4$ (lithium phosphate), $Li_4GeO_4$ (lithium germanate), $LiBO_2$ (lithium metaborate), $LiAlO_3$ (lithium aluminate) or the like can be used.

Preferable raw materials for the sulfide-based solid electrolyte are $Li_2S$ and $P_2S_5$.

Hereinbelow, an explanation will be made on a sulfide-based solid electrolyte obtained by using $Li_2S$ and $P_2S_5$ as raw materials of a sulfide-based solid electrolyte.

No specific restrictions are imposed on lithium sulfide, and commercially available lithium sulfide can be used. Highly-pure lithium sulfide is preferable. Lithium sulfide can be produced by a method described in JP-A-07-330312, JP-A-H09-283156, JP-A-2010-163356 and Japanese Patent Application No. 2009-238952.

Specifically, lithium hydroxide and hydrogen sulfide are reacted in a hydrocarbon-based organic solvent at 70° C. to 300° C. to form lithium hydroxide, and this reaction liquid is hydrodesulfurized to synthesize lithium sulfide (JP-A-2010-163356).

Further, in a water solvent, lithium hydroxide and hydrogen sulfide are reacted at 10° C. to 100° C. to form lithium hydrosulfide, then this reaction liquid is subjected to hydrodesulfurization, whereby lithium sulfide can be synthesized (Japanese Patent Application No. 2009-238952).

As for lithium sulfide, the total content of lithium salts in sulfur oxides is preferably 0.15 mass % or less, more preferably 0.1 mass % or less. The content of N-methylaminobutyric acid salt is preferably 0.15 mass % or less, more preferably 0.1 mass % or less. If the total content of lithium salts in sulfur oxides is 0.15 mass % or less, the solid electrolyte obtained by the melt extraction method or the mechanical milling method becomes a glassy electrolyte (complete amorphous). On the other hand, if the total content of lithium salts exceeds 0.15 mass %, the resulting solid electrolyte may be a crystallized product from the beginning.

If the content of N-methylamionobutyric acid salt is 0.15 mass % or less, there is no fear that a deteriorate product of N-methylamonobutyric acid salt lowers the cycle performance of a lithium ion battery. By using lithium sulfide of which the amount of impurities has been decreased, an electrolyte having a high ionic conductivity can be obtained.

If lithium sulfide is produced by the method disclosed in JP-A-H07-330312 and JP-A-H09-283156, since lithium sulfide contains lithium salts of sulfur oxides, it is preferable to conduct purification.

On the other hand, lithium sulfide produced by a method for producing lithium sulfide disclosed in JP-A-2010-163356 has a very small amount of lithium salts or the like of sulfur oxides, it can be used without purification.

As a preferable purification method, a purification method disclosed in WO2005/40039 or the like can be given. Specifically, lithium sulfide obtained by the method mentioned above is washed with an organic solvent at a temperature of 100° C. or higher.

No specific restrictions are imposed on phosphorous pentasulfide, as long as it is produced and sold on the industrial basis.

The mixing molar ratio of lithium sulfide and phosphorous pentasulfide is normally 50:50 to 80:20, preferably 60:40 to 75:25, with $Li_2S:P_2S_5$ being 68:32 to 74:26 (molar ratio) being particularly preferable.

As the method for producing a sulfide-based glass solid electrolyte, a melt extraction method, a mechanical milling method (MM method) or a slurry method in which raw materials are reacted in an organic solvent can be given.

(a) Melt Extraction Method

The melt extraction method is disclosed in JP-A-H06-279049 and WO2005/119706. Specifically, predetermined amounts of $P_2S_5$ and $Li_2S$ are mixed in a mortar to obtain a pellet-like mixture. The mixture is then put in a carbon-coated quartz tube and vacuum-sealed. After allowing, the mixture to react at a predetermined reaction temperature, the mixture is quenched by putting in ice, whereby a sulfide-based glass solid electrolyte can be obtained.

The reaction temperature is preferably 400° C. to 1000° C., more preferably 800° C. to 900° C.

The reaction time is preferably 0.1 hour to 12 hours, more preferably 1 to 12 hours.

The quenching temperature of the above-mentioned reaction product is normally 10° C. or less, preferably 0° C. or less. The cooling rate is normally about 1 to 10000K/sec, preferably 10 to 10000K/sec.

(b) Mechanical Milling Method (MM Method)

The MM method is disclosed in JP-A-H11-134937, JP-A-2004-348972 and JP-A-2004-348973, for example.

Specifically, predetermined amounts of $P_2S_5$ and $Li_2S$ are mixed in a mortar, and allowed to react for a predetermined period of time by means of various ball mills or the like, whereby a sulfide-based glass solid electrolyte can be obtained.

In the MM method in which the above-mentioned raw materials are used, a reaction can be conducted at room temperature. Therefore, it has an advantage that the raw materials do not undergo thermal decomposition, a glass electrolyte having a composition for the preparation can be obtained.

The MM method also has an advantage that, simultaneously with the production of a glass solid electrolyte, a glass solid electrolyte can be pulverized.

In the MM method, various methods such as a rotation ball mill, a tumbling ball mill, a vibration ball mill and a planetary ball mill or the like can be used.

As for the conditions for the MM method, if a planetary ball mill is used, for example, the treatment may be conducted at a rotation speed of several tens to several hundred rotations per minute for a treatment time of 0.5 hour to 100 hours.

Further, as stated in JP-A-2010-90003, balls having different diameters can be used as the balls for a ball mill.

In addition, as stated in JP-A-2009-110920 or JP-A-2009-211950, an organic solvent is added to a raw material to allow it to be a slurry, and the resulting slurry is subjected to a MM treatment.

As described in JP-A-2010-30889, the temperature inside the mill can be adjusted at the time of a MM treatment.

It is preferred that the raw material temperature at the time of a MM treatment be 60° C. or higher and 160° C. or lower.

(c) Slurry Method

The slurry method is disclosed in WO2004/093099 and WO2009/047977.

Specifically, predetermined amounts of $P_2S_5$ particles and $Li_2S$ particles are allowed to react in an organic solvent for a predetermined period of time, a sulfide-based glass solid electrolyte can be obtained.

Here, as disclosed in JP-A-2010-140893, in order to promote the reaction, the reaction may be conducted while circulating the slurring containing the raw material between the beads mill and the reaction container.

Further, as described in WO2009/047977, a reaction can be proceeded efficiently if lithium sulfide as the raw material is pulverized in advance.

Further, as described in Japanese Patent Application No. 2010-270191, in order to increase the specific surface area of lithium sulfide as the raw material, it may be immersed in a polar solvent having a polar parameter of 9.0 or more (for example, methanol, diethyl carbonate, acetonitrile) for a predetermined period of time.

The reaction time is preferably 20° C. or higher and 80° C. or lower, more preferably 20° C. or higher and 60° C. or lower.

The reaction time is preferably 1 hour or longer and 16 hours or shorter, more preferably 2 hours or longer and 14 hours or shorter.

It is preferred that an organic solvent be added such that lithium sulfide and phosphorous pentasulfide as raw materials be in the form of a slurry. Normally, the amount added of the raw materials (total amount) relative to 1 liter of the organic solvent is 0.001 kg or more and 1 kg or less. The amount is preferably 0.005 kg or more and 0.5 kg or less, and particularly preferably 0.01 kg or more and 0.3 kg or less.

Although no specific restrictions are imposed on the organic solvent, a non-protonic organic solvent is particularly preferable.

As the non-protonic organic solvent, a non-protonic, non-polar organic solvent (for example, a hydrocarbon-based organic solvent), a non-protonic, polar organic solvent (for example, an amide compound, a lactam compound, a urea compound, an organic sulfur compound, a cyclic organic phosphor compound or the like) can be preferably used as a single solvent or as a mixed solvent.

As the hydrocarbon-based organic solvent, as the hydrocarbon-based solvent as the solvent, a saturated hydrocarbon, an unsaturated hydrocarbon or an aromatic hydrocarbon can be used.

As the saturated hydrocarbon, hexane, pentane, 2-ethylhexane, heptane, decane, cyclohexane or the like can be given.

As the unsaturated hydrocarbon, hexene, heptene, cyclohexane or the like can be given.

As the aromatic hydrocarbon, toluene, xylene, decaline, 1,2,3,4-tetrahydronaphthalene or the like can be given.

Of these, toluene and xylene are particularly preferable.

It is preferred that the hydrocarbon-based solvent be dehydrated in advance. Specifically, the hydrocarbon-based solvent has a water content of preferably 100 wt ppm or less, with 30 wt ppm or less being particularly preferable.

If necessary, other solvents may be added to a hydrocarbon-based solvent. Specific examples of other solvents include ketones such as acetone and methyl ethyl ketone; ethers such as tetrahydrofuran; alcohols such as ethanol and butanol; esters such as ethyl acetate; and halogenated hydrocarbon such as dichloromethane and chlorobenzene.

The production conditions for the melt extraction method and the MM method such as temperature conditions and processing time can be appropriately adjusted by the equipment used, or the like.

The method for producing a sulfide-based solid electrolyte (glass ceramics) is disclosed in JP-A-2005-228570, WOP2007/066539 and JP-A-2002-109955.

Specifically, the sulfide-based solid electrolyte (glass) obtained above is subjected to a heat treatment at a prescribed temperature, whereby sulfide-based crystalline glass (glass ceramics) is generated.

It is preferred that heating be conducted at a dew point of −40° C. or less, more preferably at a dew point of −60° C. or less.

The pressure at the time of heating may be at normal pressure or under reduced pressure.

The atmosphere may be air or may be inert gas.

Further, as described in JP-A-2010-186744, heating may be conducted in a solvent.

The heat treatment temperature for forming glass ceramics having a $Li_7P_3S_{11}$ structure is preferably 180° C. or higher and 330° C. or lower, more preferably 200° C. or higher and 320° C. or lower, and particularly preferably 210° C. or higher and 310° C. or lower. If the heat treatment temperature is lower than 180° C., crystallized glass having a high crystallization degree may not be obtained easily. If the heat treatment temperature is higher than 330° C., crystallized glass having a low crystallization degree may be formed.

The heat treatment time is preferably 3 hours or longer and 240 hours or shorter if the heat treatment temperature is 180° C. or higher and 210° C. or lower. In particular, a heat treatment time of 4 hours or longer and 230 hours or shorter is preferable. If the heat treatment temperature is higher than 210° C. and 330° C. or lower, the heat treatment time is preferably 0.1 hour or longer and 240 hours or shorter, particularly preferably 0.2 hour or longer and 235 hours or shorter, with 0.3 hour or longer and 230 hours or shorter being further preferable.

If the heat treatment time is shorter than 0.1 hour, crystallized glass having a high degree of crystallization may not be obtained easily. If the heat treatment time is longer than 240 hours, crystallized glass having a low degree of crystallization may be formed.

The $Li_7PS_6$ crystal structure, the $Li_4P_2S_6$ crystal structure, the $Li_3PS_4$ crystal structure, the $Li_4SiS_4$ crystal structure and the $Li_2SiS_3$ crystal structure may be produced by a known method.

For example, by the method disclosed in JP-A-2002-109955, the crystallized glass having the above-mentioned crystal structure can be produced.

(2) Binder

The binder used in the invention may preferably be a resin having the following structural unit A in the molecular skeleton.

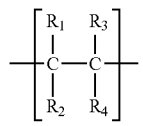 (A)

wherein in the formula, $R_1$ to $R_4$ are independently H, F, $CF_3$, $CH_2CF_3$, $CF_2CF_3$, $CF_2CF_2CF_3$, $OCF_2CF_2CF_3$, $OCF_3$ or Cl, and at least one of $R_1$ to $R_4$ is F, $CF_3$, $CH_2CF_3$, $CF_2CF_3$, $CF_2CF_2CF_3$, $OCF_2CF_2CF_3$ or $OCF_3$.

The binder is preferably a copolymer having a structure ($R_1$=F, $R_2$=F, $R_3$=H, $R_4$=H) derived from vinylidene fluoride; a copolymer or a homopolymer having a structure ($R_1$=F, $R_2$=F, $R_3$=F, $R_4$=F) derived from polyvinylidene fluoride (PVDF) and tetrafluoroethylene (TEF); a copolymer or a homopolymer having a structure ($R_1$=F, $R_2$=F, $R_3$=$CF_3$, $R_4$=F) derived from hexafluoropropylene (HFP).

Specific examples thereof include PVDF-HFP, PVDF-HFP-TEF, PVDF-TEF and TEF-HFP.

As the binder, a binder that is dissolved in an organic solvent is preferable. It is further preferred that the binder be dissolved in a hydrocarbon-based solvent, a nitrile-based solvent, a fluorine-based solvent, a thio-based solvent or the like.

(3) Other Components

To the electrolyte layer of the invention, in addition to the electrolyte particles and the binder mentioned above, additives such as a conductive aid, a thickening agent, a dispersant may be added according to need.

As the conductive aid, a conductive aid based on carbon black such as denka black and ketjen black, conductive oxide particles, silver particles, conductive polymers or the like can be given.

As the thickening agent, propylene glycol, carboxymethyl cellulose (CMC), polyacrylonitrile (PAN), polybutylene naphthalate (PBN), polyethylene oxide (PEO) or the like can be given.

In the electrolyte layer of the invention, the ratio of electrolyte particles is 50 wt % or more and 99.5 wt % or less relative to the total weight of the electrolyte particles and the binder. If the ratio of the electrolyte particles is less than 50 wt %, the ionic conductivity may be lowered, and as a result, performance of a battery when produced by using the electrolyte sheet may be deteriorated. On the other hand, if the ratio of the electrolyte particles exceeds 99.5 wt %, the strength of the electrolyte sheet may be lowered, and the adhesiveness with the base material may be lowered.

The ratio of the electrolyte particles is 65 wt % or more and 99.5 wt % or less, further preferably 75 wt % or more and 99 wt % or less, 80 wt % or more and 99 wt % or less, with 85 wt % or more and 99 wt % or less being more preferable.

2. Base Material

The base material used in the invention serves to support the above-mentioned electrolyte layer, and peels off from the electrolyte layer when the electrolyte layer is transferred.

Although no specific restrictions are imposed on the base material, resin films such as polyethylene (PE), polyethylene terephthalate (PET), polybutylene terephthalate (PBT), polypropylene (PP), polyvinyl chloride (PVC), polystyrene (PS), syndiotactic polystyrene (SPS), polymethyl methacrylate (PMMA), acrylonitrile-styrene resin film copolymer (ABS), cycloolefin polymer (COP), polyamide (PA), polyimide (PI), polycarbonate (PC) and a fluorine resin; or a sheet of a metal such as Al, Cu, SUS and Ti.

No specific restrictions are imposed on the thickness of the base material. The thickness is normally 20 µm to 150 µm.

Commercially available base materials can be used.

The electrolyte sheet of the invention can be produced by forming an electrolyte layer on the base material. The electrolyte layer can be formed by using the electrolyte slurry of the invention.

The electrolyte slurry comprising the electrolyte particles and the binder mentioned above and a solvent. Further, if necessary, the above-mentioned additive may be contained.

As the solvent, a hydrocarbon-based solvent, a nitrile-based solvent, a fluorine-based solvent and a thio-based solvent can be used.

As mentioned above, it is preferred that the solvent be one that can dissolve the above-mentioned binder. Due to the dissolution of the binder, production of the electrolyte layer can be easily produced.

In the electrolyte slurry of the invention, the concentration of slurry solid matters is 20 wt % or more and 90 wt % or less. Outside this range, film formation cannot be conducted even if the slurry is applied and dried. The concentration of slurry solid matters is preferably 30 wt % or more and 80 wt % or less.

From the electrolyte particles in the electrolyte layer, the electrolyte particles in the slurry solid matters are contained in amount of 50 wt % or more and 99.5 wt % or less.

The electrolyte layer can be formed by applying the above-mentioned electrolyte slurry on the base material, followed by drying. For the application and drying, known methods can be applied. The solvent may remain on the electrolyte layer.

The thickness of the electrolyte layer may be appropriately adjusted by the shape or application of a battery. Normally, the thickness of the electrolyte layer is 10 to 500 µm.

As for the electrolyte sheet of the invention, after the transfer of the electrolyte layer in the following transfer test, the electrolyte particles and the binder do not remain on the base material, and the electrolyte layer is transferred to an object without peeling.

Similarly, as for the electrolyte slurry of the invention, in the transfer test of the electrolyte sheet comprising the electrolyte layer formed by using the slurry and the base material, after the transfer of the electrolyte layer, the electrolyte particles and the binder do not remain on the base material, and the electrolyte layer is transferred without peeling.

In the transfer test of the invention, by using the electrolyte sheet of the invention or the electrolyte sheet comprising the electrolyte layer formed by using the slurry of the invention and the base material, the electrolyte layer is transferred to a positive electrode sheet as an object to be transferred, and evaluation is conducted by observing the state after the transfer.

(1) Positive Electrode Sheet

On a 20 µm-thick aluminum sheet, a positive electrode slurry is applied, and dried on a hot plate at 80° C. for 10 minutes. Further, vacuum drying is conducted at 80° C. for 4 hours, whereby a positive electrode sheet having a positive electrode layer having a thickness of 100 µm (a stacked body of a positive electrode sheet and aluminum) is produced.

The positive electrode slurry is obtained by mixing the positive electrode active material, the electrolyte particles, the binder and the solvent at a weight ratio of 19:19:2:60.

Positive Electrode Active Material

A positive electrode active material is produced by a method in which 0.400 g of sulfur (manufactured by Sigma-Aldrich Japan, purity: 99.998%) and 0.400 g of ketjen black (KB) EC600JD, manufactured by Lion Corporation) are mixed in a mortar, the mixture is put in a stainless-made container having a sealing property, and then subjected to a heat treatment in an electric furnace. Heating is conducted as follows: heated at a heating rate of 10° C./min from room temperature to 150° C., retained at 150° C. for 6 hours, further heated to 300° C. at a heating rate of 10° C./min, retained for 2.75 hours, and naturally cooled.

Electrolyte Particles

Electrolyte particles are produced by the same method as mentioned in Example 1 of WO2005/078740.

Binder

As a binder, Kynar2500-20 manufactured by Arkema Inc. is used; and

Solvent

As a solvent, isobutylnitrile manufactured by Tokyo Chemical Industries, Co. Ltd. is used.

(2) Transfer Test

An electrolyte sheet as a test piece is formed into a cylindrical shape having a radius of 16.5 mm by means of a punch; similarly, the positive electrode sheet is formed into a cylindrical shape having a radium of 16.5 mm by means of a punch.

FIG. 1 shows a side view of a mold used in the transfer test, in which (a) is a side view of each mold and (b) is a side view of a sample when it is placed. This mold is formed of a middle mold 11, an upper mold 12 and a lower mold 13. Protruded parts of the upper mold 12 and the lower mold 13 are inserted into the cylindrical hollow part of the middle mold 11. A test piece 14 placed between the upper mold 12 and the lower mold 13 is pressurized in the middle mold 11. The mold is made of SUS. The diameter of the protruded part of the upper mold 12 and the lower mold 13 is 16.5 mm, the diameter of the bottom part is 50 mm, the thickness of the bottom part is 6 mm, the height of the upper mold and the protruded part is 32 mm and the height of the protruded part of the lower mold 13 is 10 mm. The diameter and the height of the hollow part of the middle mold 11 are 16.65 mm and 30 mm, respectively.

The electrolyte sheet and the positive electrode sheet are overlapped such that the electrolyte layer and the positive electrode layer are in contact with each other and then inserted into the middle mold 11.

The test piece 14 is sandwiched between an upper mold 12 and the lower mold 14 and a pressure of 270 MPa is applied for 10 seconds to the entire test piece; after application of a pressure, the electrolyte sheet and the positive electrode sheet that have been integrated are taken out from the mold. The base material for the electrolyte sheet is peeled off and a peeling surface and a connection surface of the electrolyte layer and the positive electrode layer are visually observed.

In the electrolyte sheet of the invention, in this transfer test, the electrolyte particles and the binder do not remain on the base material after the transfer of the electrolyte layer, and the electrolyte layer is transferred to an object to be transferred without peeling.

The evaluation of the electrolyte sheet comprising the electrolyte layer formed by using the electrolyte slurry of the invention and the base material is conducted as follows.

As the base material for the electrolyte sheet, a peeled PET film NGS (peel force 244 mN/cm) manufactured by Fujimori Kogyo Co., Ltd. is used.

The electrolyte sheet is produced by a method in which a slurry to be measured is applied to the base material, the resultant is dried at 80° C. for 5 minutes on a hot plate, and further subjected to vacuum drying at 100° C. for 4 hours to form an electrolyte layer. The thickness of the electrolyte layer is 100 μm (at the time of application).

The production of the positive electrode sheet is conducted by the same method as in the above-mentioned (1), except that the positive electrode layer is dried at 80° C. for 5 minutes on a hot plate, further subjected to vacuum drying at 80° C. for 8 hours. The thickness of the positive electrode layer is 50 μm.

The positive electrode sheet is produced by the same method as in the above-mentioned (2), except that the mold is made of hard chromium plating.

In the invention, the peel force of the base material is preferably 20 mN/cm or more and 1500 mN/cm or less. The peel force of the base material is a value obtained by a method in which the 31B tape manufactured by Nitto Denko Corporation is pressed to the base material at 70° C. for 20 hours at a pressure of 2 kPa, followed by peeling at room temperature from the base material side at a peeling speed of 300 mm/min and a peel angle of 180°. This measurement is in accordance with JIS Z 0237. If the peel force falls outside the range of 20 mN/cm or more and 1500 mN/cm or less, the base material may not be peeled off from the electrolyte layer or, after the transfer, part of the electrolyte layer may remain on the base material. The peel force is more preferably 50 mN/cm or more and 1300 mN/cm or less, and further preferably 90 mN/cm or more and 1100 mN/cm or less.

In the invention, the ionic conductivity of the electrolyte layer is preferably $1.0 \times 10^{-6}$ S/cm or more. If the ionic conductivity is less than $1.0 \times 10^{-6}$ S/cm, the performance of a battery produced by using the electrolyte sheet may be poor.

In the invention, the ionic conductivity of the electrolyte layer is measured by the following method.

An electrolyte sheet is formed into a cylindrical shape having a radius of 10 mm by means of a punch, and the cylindrical electrolyte sheet is then inserted in a pressure mold, followed by application of a pressure of 370 MPa for 10 seconds. The electrolyte sheet is taken out from the mold, and the base material of the electrolyte sheet is peeled. Only the electrolyte layer obtained by peeling is inserted into the mold again.

Gold that has been formed into a 0.1 mm-thick cylindrical shape having a radius of 9.5 mm is put in the upper and lower sides of the electrolyte layer. Further, a pressure of 185 MPa is applied for 10 seconds. The screw of the mold is fastened with a force of 8N, and electrodes are taken out from the upper and lower sides of the mold.

For this sample, by means of an impedance apparatus manufactured by Toyo Corporation, the ionic conductivity is measured at 25° C., an AC amplitude modulation of 10 mV and a frequency of $5 \times 10^6$ to 0.1 Hz.

The electrolyte sheet or the electrolyte slurry of the invention can be preferably used for the formation of an electrolyte of a battery. It suffices that the battery of the invention be provided with an electrolyte layer that is obtained by using the electrolyte sheet or the electrolyte slurry. As for other configurations, configurations known in this technical field can be used. For example, on one surface of the electrolyte layer of the electrolyte sheet, the positive electrode layer or the negative electrode layer is stacked, and an electrode layer serving as a counter electrode on the opposite surface.

The positive electrode and the negative electrode can be produced by applying and drying a positive electrode mix slurry or a negative electrode mix slurry as is known in the field. The base material of the electrode sheet is peeled off from the electrolyte layer, and the positive electrode layer or the negative electrode layer and the current collector are adhered. Thereafter, on the opposite side of the electrolyte layer, a counter electrode layer is stacked to allow the electrolyte layer to be adhered to the current collector, whereby a battery is produced.

As for the production of the positive electrode and the negative electrode, a known production method can be used without particular restrictions.

The apparatus of the invention is provided with the above-mentioned battery. As the apparatus, an electric car can be given, for example.

A method for producing a stacked body having the electrode (positive electrode or negative electrode) layer and the electrolyte layer of the invention comprises the steps of applying an electrolyte slurry comprising electrolyte particles having a composition represented by the above formula (1) and a binder that is a resin comprising a structural unit A in the molecular skeleton to a base material (i.e. a step of forming an electrolyte sheet) and transferring the electrolyte layer to the electrode material layer and peeling the base material off from the electrolyte layer. The solid matter concentration of the electrolyte slurry is 20 wt % or more and 90 wt % or less, the ratio of the electrolyte particles in the solid matter is 50 wt % or more and 99.5 wt % or less, and the peel force of the base material is 20 mN/cm or more and 1500 mN/cm or less.

As for the electrolyte slurry and the electrolyte sheet, those explained above referring to the electrolyte slurry or the electrolyte sheet of the invention can be used.

A step of transferring the electrolyte layer to the electrode material layer and peeling the base material from the electrolyte layer can be conducted as follows, for example. The electrolyte sheet and the electrode material layer are overlapped such that the electrolyte layer is adhered to the electrode material layer as an object to be transferred, and a pressure is applied. Thereafter, the electrolyte layer is peeled off from the electrolyte layer. The pressure applied or the time at the time of adhesion may be appropriately adjusted taking the thickness or the like of the electrolyte layer into consideration.

The resulting stacked body of the electrode material and the electrolyte layer can be used in a battery, for example.

It is preferred that the structural unit A be a structure derived from vinylidene fluoride, a structure derived from tetrafluroethylene or a structure derived from hexafluoropropylene.

It is preferred that the average particle diameter ($D_{50}$) of the electrolyte particles be 5 nm or more and 50 µm or less.

EXAMPLES

The invention will be explained in more detail in accordance with the examples. The measurement method for samples is as follows.
(1) Ionic Conductivity of Electrolyte Particles 0.3 g of electrolyte particles is weighed, and placed in a container. A pressure of 185 MPa is applied to the electrolyte particles. After pressure application, to the upper and lower sides of the sample, 1.0 mg of SFG manufactured by TIMCAI Ltd. is respectively put, and a pressure of 185 MPa is applied again, whereby an electrode is formed in each of the upper and lower sides of the container. For the resulting sample, by means of an impedance apparatus manufactured by Toyo Corporation, the conductivity is measured at 25° C., an AC amplitude modulation of 10 mV and a frequency of 10 M to 10 Hz.
(2) Average Particle Diameter of Electrolyte Particles By means of a laser diffraction particle size distribution analyzer (Mastersizer 2000 manufactured by Malvern Instruments, Ltd.), in a dispersion tank of the apparatus, 110 ml of toluene that has been dehydrated (product name: special grade, manufactured by Wako Pure Chemical Industries, Ltd.) is put, and further, as a dispersant, 6% of tertiary butyl alcohol (special grade, manufactured by Wako Pure Chemical Industries, Ltd.) is added.

The above-mentioned mixture is fully mixed, and electrolyte particles are added to measure the particle size. The amount of the electrolyte particles to be added is such that the laser scattering intensity corresponding to the particle density is within the predetermined range (10 to 20%) in an operation screen specified by the Mastersizer 2000 (although the optimum amount of the electrolyte particles added varies depending on the kind or the like thereof, it is about 0.01 g to 0.05 g).
(3) Ionic Conductivity of Electrolyte Layer An electrolyte sheet is formed into a cylindrical shape having a radius of 10 mm by means of a punch, and the cylindrical electrolyte sheet is then inserted in a pressure mold, followed by application of a pressure of 370 MPa for 10 seconds. The electrolyte sheet is taken out from the mold, and the base material of the electrolyte sheet is peeled off. Only the electrolyte layer obtained by peeling is inserted into the mold again.

Gold that has been formed into a 0.01 mm-thick cylindrical shape having a radius of 9 mm is put in the upper and lower sides of the electrolyte layer. Further, a pressure of 185 MPa is applied for 10 seconds. The screw of the mold is fastened with a force of 8N, and an electrode is taken out from the upper and lower sides of the mold.

For this sample, by means of an impedance apparatus manufactured by Toyo Corporation, the ionic conductivity is measured at 25° C., an AC amplitude modulation of 10 mV and a frequency of $5 \times 10^6$ to 0.1 Hz.
(4) Transfer Test
(A) Positive Electrode Sheet A positive electrode slurry is applied to a 20 µm-thick aluminum sheet, dried at 80° C. on a hot plate for 10 minutes, and further subjected to vacuum drying at 80° C. for 8 hours to produce a positive electrode sheet (a stacked body of a positive electrode layer and aluminum) including a positive electrode layer having a thickness of 100 µm.

The positive electrode slurry is obtained by mixing the following positive electrode active material, electrode particles, a binder and a solvent at a weight ratio of 19:19:2:60.
Positive Electrode Active Material A positive electrode active material is produced by a method in which 0.400 g of sulfur (manufactured by Sigma-Aldrich Japan, purity: 99.998%) and 0.400 g of ketjen black (KB) EC600JD, manufactured by Lion Corporation) are mixed in a mortar, the mixture is put in a sealable stainless-made container, and then subjected to a heat treatment in an electric furnace. Heating is conducted as follows: heated at a heating rate of 10° C./min from room temperature to 150° C., retained at 150° C. for 6 hours, further heated to 300° C. at a heating rate of 10° C./min, retained for 2.75 hours, and naturally cooled.

Electrolyte Particles

Electrolyte particles are produced by the same method as mentioned in Example 1 of WO2005/078740.

Binder

As a binder, Kynar2500-20 manufactured by Arkema Inc. is used.

Solvent

As a solvent, isobutylnitrile manufactured by Tokyo Chemical Industry Co., Ltd. is used.

(B) Transfer Test

An electrolyte sheet as a test sample is formed into a cylindrical shape having a radius of 16.5 mm by means of a punch; similarly, the positive electrode sheet is formed into a cylindrical shape having a radius of 16.5 mm by means of a punch.

The electrolyte sheet and the positive electrode sheet are overlapped such that the electrolyte layer and the positive electrode layer are in contact with each other and then inserted into a cylindrical middle mold that is shown in FIG. 1.

The sheets are sandwiched between an upper mold and a lower mold and a pressure of 270 MPa is applied for 10 seconds to the entire sheets, after application of a pressure, the electrolyte sheet and the positive electrode sheet that have been integrated are taken out from the mold; and the base material for the electrolyte sheet is peeled off; and a peeling surface and a connection surface of the electrolyte layer and the positive electrode layer are visually observed.

(5) Peel Force of the Base Material

After pressing the 31B tape manufactured by Nitto Denko Corporation to the base material at 70° C. for 20 hours at a pressure of 2 kPa, the tape was peeled off at room temperature from the base material side at a rate of 300 mm/min and a peel angle of 180° (according to JIS Z0237).

Production Example 1

Production of Lithium Sulfide ($Li_2S$)

Production and purification of lithium sulfide were conducted in the same way as in described in the Example of WO2005/040039A1. Specifically, lithium sulfide was produced and purified as follows:

(1) Production of Lithium Sulfide

In a 10-liter autoclave provided with a stirring blade, 3326.4 g (33.6 mol) of N-methyl-2-pyrrolidone (NMP) and 287.4 g (12 mol) of lithium hydroxide were charged, rotated at 300 rpm and heated to 130° C. After heating, hydrogen sulfide was blown to the liquid at a supply speed of 3 liters/min for 2 hours.

Subsequently, this reaction liquid was heated in a nitrogen gas stream (200 cc/min), and part of reacted hydrogen sulfide is hydrodesulfurized. With an increase in temperature, water generated as a side product of the reaction of hydrogen sulfide and lithium hydroxide began to evaporate. This water was condensed by means of a condenser and withdrawn outside the system. The temperature of the reaction liquid was elevated while water was distilled away out of the system. Heating was stopped at the point where the temperature reached 180° C. to maintain the reaction liquid at a certain temperature. After the completion of hydrodesulfurization (about 80 minutes), the reaction was completed to obtain lithium sulfide.

(2) Purification of Lithium Sulfide

After NMP in the 500-mL slurry reaction solution (NMP-lithium sulfide slurry) obtained in the above-mentioned (1) was subjected to decantation, 100 mL of dehydrated NMP was added thereto. Then, the mixture was stirred at 105° C. for about one hour. With the temperature being maintained, NMP was subjected to decantation. Further, 100 mL of NMP was added and stirred at 105° C. for about one hour, and NMP was subjected to decantation with the temperature being maintained. The same operation was repeated 4 times in total. After the completion of the decantation, lithium sulfide was dried in a nitrogen gas stream, at 230° C. (which is a temperature equal to or higher than the boiling point of NMP), under ordinary pressure for 3 hours to obtain purified lithium sulfide. The impurity content of the purified lithium sulfide obtained was measured.

The total content of sulfur oxides of lithium sulfite ($Li_2SO_3$), lithium sulfate ($Li_2SO_4$) and thiosulfuric acid dilithium salt ($Li_2S_2O_3$) and the content of N-methylaminobutyric acid lithium salt (LMAB) were measured by the ion chromatography. As a result, it was found that the total content of sulfur oxides was 0.13 mass %, and the content of N-methylaminobutyric acid lithium salt (LMAB) was 0.07 mass %.

Production Example 2

Production of Electrolyte Particles 1

By using the lithium sulfide produced in Production Example 1, production and crystallization of a solid electrolyte were conducted by the same method as mentioned in Example 1 of WO07/066539.

Specifically, production was conducted as follows.

0.6508 g (0.01417 mol) of lithium sulfide produced in Production Example 1 and 1.3492 g (0.00607 mol) of phosphorous pentasulfide (manufactured by Sigma-Aldrich Japan.) were fully mixed. The mixture powder and 10 zirconia balls each having a diameter of 10 mm were placed in an alumina-made pot of a planetary ball mill (P-7, manufactured by Fritsch) and completely sealed. The alumina-made pot was filled with nitrogen to allow the inside of the pot to be nitrogen atmosphere.

For the initial several minutes, the planetary ball mill was rotated at a low speed (85 rpm) to allow lithium sulfide and phosphorous pentasulfide to be fully mixed. Thereafter, the rotation speed of the planetary ball mill was gradually increased to 370 rpm. Mechanical milling was conducted for 20 hours at a rotational speed of the planetary ball mill of 370 rpm. White yellow powder obtained after the mechanical milling treatment was evaluated by means of an X-ray measurement. As a result, it was found that the powder was vitrified (sulfide glass). The glass transition temperature of this sulfide glass was measured by DSC (differential scanning calorimetry) and found to be 220° C.

The sulfide glass was heated in a nitrogen atmosphere at 300° C. for 2 hours, whereby glass ceramics was obtained.

72 g of the resulting sulfide glass ceramics and 100 g of toluene were stirred at 200 rpm for 2 hours by means of a planetary ball mill (LP-4 manufactured by Ito Mfg. Co., Ltd; 743 g of Zr balls each having a diameter of 10 mm), whereby electrolyte particles were obtained.

For the electrolyte particles 1 (glass sulfide ceramics), an X-ray diffraction measurement was conducted. A peak appeared at 2θ=17.8, 18.2, 19.8, 21.8, 23.8, 25.9, 29.5 and 30.0 deg.

The average particle diameter of the electrolyte particles 1 was 8.8 μm. The ionic conductivity was $6.36 \times 10^{-4}$ S/cm.

Production Example 3

Production of Electrolyte Particles 2

Electrolyte particles were produced in the same manner as in Production Example 2, except that the amount of the highly pure lithium sulfide produced and purified in Production Example 1 was changed to 0.766 g (0.0166 mol) and the amount of phosphorous pentasulfide (manufactured by Sigma-Aldrich Japan) was changed to 1.22 g (0.0055 mol) and heating in a nitrogen gas stream at 300° C. for 2 hours was not conducted.

For the resulting electrolyte particles 2, by the X-ray diffraction measurement, it was confirmed that the particles were vitrified. The average particle size of the electrolyte particles 2 was 11.2 μm. The ionic conductivity was $1.22 \times 10^{-4}$ S/cm.

Example 1

10.0 g of a binder (Kynar2500-20 manufactured by Arkema Inc., a PVDF-HFP copolymer, weight ratio PVDF:HFD=80:20) was weighed. To the binder, 40.0 g of isobutyronitrile (manufactured by Tokyo Chemical Industry Co. Ltd.) was added and dissolved by heating at 80° C. to form a binder solution. Hereinafter, this binder solution is referred to as the KYNAR2500-20 binder solution.

5.27 g of the electrolyte particles 1 produced in Production Example 2, 2.93 g of the above-mentioned KYNAR2500-20 binder solution, and 4.81 g of isobutyronitrile were respectively placed in a small-sized Filmix apparatus manufactured by Primix Corporation, and the resultant was mixed by stirring at 15000 rpm for 1 minute, whereby an electrolyte slurry (solid matter concentration of the slurry 45.1 wt %).

The resulting slurry was applied to a PET film as a base material (38E-0010NSG, a PET film manufactured by Fujimori Kogyo Co., Ltd., Peel force: 244 mN/cm) by means of a 500 μm GAP doctor blade, whereby an electrolyte sheet was produced. The resultant was dried at 80° C. for 5 minutes on a hot plate, and then subjected to vacuum drying at 100° C. for 4 hours. At the same time, a sample obtained by application by means of a 100 μm GAP doctor blade was prepared, and similarly dried. The 500 μm (at the time of application) sheet was used for measuring the ionic conductivity and the 100 μm (at the time of application) was used for the transfer test.

As a result of measuring the ionic conductivity by using the method for measuring the ionic conductivity of the electrolyte layer of the above-mentioned solid electrolyte sheet, the ionic conductivity was found to be $7.87 \times 10^{-5}$ S/cm.

As a result of the transfer test, no materials remained on the base material, and no peeling was observed between the positive electrode layer and the electrolyte layer.

Example 2

An electrolyte slurry and an electrolyte sheet were produced and evaluated in the same manner as in Example 1, except that the amount of the electrolyte particles 1 in Production Example 2 was changed to 5.56 g, the amount of the KYNAR2500-20 binder solution was changed to 1.46 g and the amount of isobutylnitrile was changed to 5.98 g.

The ionic conductivity of the electrolyte layer of the electrolyte sheet was $9.71 \times 10^{-5}$ S/cm.

As a result of the transfer test, no materials remained on the base material, and no peeling was observed between the positive electrode layer and the electrolyte layer.

Example 3

An electrolyte slurry and an electrolyte sheet were produced and evaluated in the same manner as in Example 1, except that the amount of the electrolyte particles 1 in Production. Example 2 was changed to 4.90 g, the amount of the KYNAR2500-20 binder solution was changed to 0.25 g and the amount of isobutylnitrile was changed to 5.85 g.

The ionic conductivity of the electrolyte layer of the electrolyte sheet was $1.01 \times 10^{-4}$ S/cm.

As a result of the transfer test, no materials remained on the base material, and no peeling was observed between the positive electrode layer and the electrolyte layer.

Example 4

An electrolyte slurry and an electrolyte sheet were produced and evaluated in the same manner as in Example 1, except that the amount of the electrolyte particles 1 in Production Example 2 was changed to 4.68 g, the amount of the KYNAR2500-20 binder solution was changed to 5.85 g and the amount of isobutylnitrile was changed to 2.47 g.

The ionic conductivity of the electrolyte layer of the electrolyte sheet was $8.44 \times 10^{-6}$ S/cm.

As a result of the transfer test, no materials remained on the base material, and no peeling was observed between the positive electrode layer and the electrolyte layer.

Example 5

An electrolyte slurry and an electrolyte sheet were produced and evaluated in the same manner as in Example 1, except that the amount of the electrolyte particles 1 in Production Example 2 was changed to 4.10 g, the amount of the KYNAR2500-20 binder solution was changed to 8.76 g and the amount of isobutylnitrile was changed to 0.13 g.

The ionic conductivity of the electrolyte layer of the electrolyte sheet was $1.79 \times 10^{-6}$ S/cm.

As a result of the transfer test, no materials remained on the base material, and no peeling was observed between the positive electrode layer and the electrolyte layer.

Example 6

5.0 g of a binder (KYNAR2801-00 manufactured by Arkema Inc., a PVDF-HFP copolymer, weight ratio PVDF:HFP=90:10) was weighed. To the binder, 45.0 g of isobutyronitrile (manufactured by Tokyo Chemical Industry Co. Ltd.) was added and dissolved by heating at 80° C. to form a binder solution. Hereinafter, this binder solution is referred to as the KYNAR2801-00 binder solution.

An electrolyte slurry and an electrolyte sheet were produced and evaluated in the same manner as in Example 1, except that the amount of the electrolyte particles 1 in Production Example 2 was changed to 5.27 g, the amount of the KYNAR2801-00 binder solution was changed to 5.85 g and the amount of isobutylnitrile was changed to 1.89 g.

The ionic conductivity of the electrolyte layer of the electrolyte sheet was $8.43 \times 10^{-5}$ S/cm.

As a result of the transfer test, no materials remained on the base material, and no peeling was observed between the positive electrode layer and the electrolyte layer.

Example 7

2.4 g of a binder (KYNAR-ADS manufactured by Arkema Inc., a PVDF-HFP-TEF copolymer was added to 27.6 g of trifluoromethylbenzene (manufactured by Wako Pure Chemical Industries, Ltd.), and dissolved by heating at 80° C. The resulting solution was used as the KYNAR-ADS binder solution.

An electrolyte slurry and an electrolyte sheet were produced and evaluated in the same manner as in Example 1, except that the amount of the electrolyte particles 1 in Production Example 2 was changed to 5.27 g, the amount of the KYNAR-ADS binder solution was changed to 7.31 g and the amount of trifluorobenzene was changed to 0.42 g.

The ionic conductivity of the electrolyte layer of the electrolyte sheet was $2.00 \times 10^{-5}$ S/cm.

As a result of the transfer test, no materials remained on the base material, and no peeling was observed between the positive electrode layer and the electrolyte layer.

Example 8

3.0 g of a binder (KYNAR-SL manufactured by Arkema Inc., a PVDF-TEF copolymer) was added to 27.0 g of isobutylnitrile (manufactured by Wako Pure Chemicals Industries, Ltd.), and dissolved by heating at 80° C. The resulting solution was used as the KYNAR-SL binder solution.

An electrolyte slurry and an electrolyte sheet were produced and evaluated in the same manner as in Example 1, except that the amount of the electrolyte particles 1 in Production Example 2 was changed to 5.27 g, the amount of the KYNAR-SL binder solution was changed to 5.85 g and the amount of isobutylnitrile was changed to 1.89 g.

The ionic conductivity of the electrolyte layer of the electrolyte sheet was $1.29 \times 10^{-4}$ S/cm.

As a result of the transfer test, no materials remained on the base material, and no peeling was observed between the positive electrode layer and the electrolyte layer.

Example 9

3.0 g of Dyneon THV221AZ manufactured by Sumitomo 3M Ltd. was added to 27.0 g of isobutylnitrile (manufactured by Tokyo Chemical Industry Co. Ltd.) and dissolved by heating at 80° C. The resulting solution was used as a THV221AZ binder solution.

An electrolyte slurry and an electrolyte sheet were produced and evaluated in the same manner as in Example 1, except that the amount of the electrolyte particles 1 in Production Example 2 was changed to 5.27 g, the amount of the THV221AZ binder solution was changed to 5.85 g and the amount of isobutylnitrile was changed to 1.89 g.

The ionic conductivity of the electrolyte layer of the electrolyte sheet was $8.92 \times 10^{-5}$ S/cm.

As a result of the transfer test, no materials remained on the base material, and no peeling was observed between the positive electrode layer and the electrolyte layer.

Example 10

A sheet was produced in the same manner as in Example 2, except that the electrolyte particles 2 of Production Example 3 were used.

The ionic conductivity of the electrolyte layer of the electrolyte sheet was $7.82 \times 10^{-6}$ S/cm.

As a result of the transfer test, no materials remained on the base material, and no peeling was observed between the positive electrode layer and the electrolyte layer.

Example 11

An electrolyte slurry and an electrolyte sheet were produced and evaluated in the same manner as in Example 1, except that the amount of the electrolyte particles 2 in Production Example 3 was changed to 5.13 g, the amount of the KYNAR-SL binder solution was changed to 5.4 g and the amount of isobutylnitrile was changed to 1.47 g.

The ionic conductivity of the electrolyte layer of the electrolyte sheet was $2.04 \times 10^{-5}$ S/cm.

As a result of the transfer test, no materials remained on the base material, and no peeling was observed between the positive electrode layer and the electrolyte layer.

Example 12

An electrolyte slurry and an electrolyte sheet were produced and evaluated in the same manner as in Example 1, except that the base material was changed to Panapeel NP-75C (peel force: 59 mN/cm) manufactured by Panac Industries, Inc.

The ionic conductivity of the electrolyte layer of the electrolyte sheet was $8.60 \times 10^{-5}$ S/cm.

As a result of the transfer test, no materials remained on the base material, and no peeling was observed between the positive electrode layer and the electrolyte layer.

Example 13

An electrolyte slurry and an electrolyte sheet were produced and evaluated in the same manner as in Example 1, except that the base material was changed to Panapeel TP-01 (peel force: 1000 mN/cm) manufactured by Panac Industries, Inc.

The ionic conductivity of the electrolyte layer of the electrolyte sheet was $9.12 \times 10^{-5}$ S/cm.

As a result of the transfer test, no materials remained on the base material, and no peeling was observed between the positive electrode layer and the electrolyte layer.

Comparative Example 1

A slurry was prepared in the same manner as in Example 2, except that a copolymer resin of polyethylene oxide (PEO, —[$CH_2CH_2$]$_n$—) and polypropylene oxide (PPO, —[$CHCH_3CH_2$]$_n$—). However, since electrolyte particles underwent sedimentation, application could not be conducted.

Comparative Example 2

5.85 g of the electrolyte particles 1 of Production Example 2 and 7.15 g of isobutylnitrile were placed in a vessel of a small-sized Filmix. The resultant was stirred at 15000 rpm for 1 minute. The thus obtained slurry was formed into a sheet as in Example 1. A transfer test was conducted by using this sheet, and it was found that the edge part of the sheet was peeled at the time of cutting.

Comparative Example 3

The electrolyte slurry prepared in Example 1 was applied to the Panapeel SG-1 (peel force: 3600 mN/cm) manufactured by Panac Industries, Inc. as the base material by means of a 100 μmGAP doctor blade. As a result, it was found that the sheet remained on the base material without being transferred.

Comparative Example 4

2.08 g of the electrolyte particles 1 of Production Example 2, 3.12 g of KYNAR2801-00 powder and 7.80 g of isobutylnitrile were placed in a vessel of a small-sized Filmix. The resultant was stirred at 15000 rpm for 1 minute. As a result, the slurry was solidified, and hence could not applied.

The materials used in Examples and Comparative Examples and the evaluation results are shown in Table 1.

TABLE 1

| | Electrolyte particles: Ionic conductivity (S/cm) | | Binder | Amount of electrolyte particles relative to the total amount of solid matters | Ionic conductivity of electrolyte layer(S/cm) | Peel force of base material (mN/cm) | Judgment of capability of transfer |
|---|---|---|---|---|---|---|---|
| Example 1 | Production Ex. 2 | $6.36 \times 10^{-4}$ | Kynar2500-20 | 90 | $7.87 \times 10^{-5}$ | 244 | Possible |
| Example 2 | Production Ex. 2 | $6.36 \times 10^{-4}$ | Kynar2500-20 | 95 | $9.71 \times 10^{-5}$ | 244 | Possible |
| Example 3 | Production Ex. 2 | $6.36 \times 10^{-4}$ | Kynar2500-20 | 99 | $1.01 \times 10^{-4}$ | 244 | Possible |
| Example 4 | Production Ex. 2 | $6.36 \times 10^{-4}$ | Kynar2500-20 | 80 | $8.44 \times 10^{-6}$ | 244 | Possible |
| Example 5 | Production Ex. 2 | $6.36 \times 10^{-4}$ | Kynar2500-20 | 70 | $1.79 \times 10^{-6}$ | 244 | Possible |
| Example 6 | Production Ex. 2 | $6.36 \times 10^{-4}$ | Kynar2801-00 | 95 | $8.43 \times 10^{-5}$ | 244 | Possible |
| Example 7 | Production Ex. 2 | $6.36 \times 10^{-4}$ | KynarADS | 90 | $2.00 \times 10^{-5}$ | 244 | Possible |
| Example 8 | Production Ex. 2 | $6.36 \times 10^{-4}$ | KynarSL | 90 | $1.29 \times 10^{-4}$ | 244 | Possible |
| Example 9 | Production Ex. 2 | $6.36 \times 10^{-4}$ | THV-221AZ | 90 | $8.92 \times 10^{-5}$ | 244 | Possible |
| Example 10 | Production Ex. 3 | $1.22 \times 10^{-4}$ | Kynar2500-20 | 95 | $7.82 \times 10^{-5}$ | 244 | Possible |
| Example 11 | Production Ex. 3 | $1.22 \times 10^{-4}$ | KynarSL | 95 | $2.04 \times 10^{-5}$ | 244 | Possible |
| Example 12 | Production Ex. 2 | $6.36 \times 10^{-4}$ | Kynar2500-20 | 90 | $8.60 \times 10^{-5}$ | 59 | Possible |
| Example 13 | Production Ex. 2 | $6.36 \times 10^{-4}$ | Kynar2500-20 | 90 | $9.12 \times 10^{-5}$ | 1000 | Possible |
| Com. Ex. 1 | Production Ex. 2 | $6.36 \times 10^{-4}$ | PEO-PPO | 95 | Sheet could not be formed due to sedimentation of the slurry | | |
| Com. Ex. 2 | Production Ex. 2 | $6.36 \times 10^{-4}$ | — | 100 | Measurement was impossible | 244 | Impossible |
| Com. Ex. 3 | Production Ex. 2 | $6.36 \times 10^{-4}$ | Kynar2500-20 | 90 | Measurement was impossible | 3600 | Impossible |
| Com. Ex. 4 | Production Ex. 2 | $6.36 \times 10^{-4}$ | Kynar2801-00 | 40 | Sheet could not be formed due to solidification of the slurry | | |

Reference Example [Example 1 of WO2005/078740]

(1) Production of Lithium Sulfide ($Li_2S$)

Lithium sulfide was produced according to the method of the first aspect (two-step method) described in JP-A-H7-330312. Specifically, it was produced as follows. 3326.4 g (33.6 mol) of N-methyl-2-pyrrolidone (NMP) and 287.4 g (12 mol) of lithium hydroxide were charged in a 10-liter autoclave provided with a stirring blade, and heated to 130° C. at 300 rpm. After heating, hydrogen sulfide was blown to the resulting liquid at a supply rate of 3 liters/min for 2 hours. Subsequently, this reaction liquid was heated in a nitrogen gas stream (200 cc/minute) to hydrodesulfurize a part of reacted hydrogen sulfide. With an elevation in temperature, water generated as a side product due to the reaction of the above-mentioned hydrogen sulfide and lithium hydroxide began to evaporate. The evaporated water was condensed using a condenser and removed to the outside of the system. The temperature of the reaction liquid rose while water was distilled away out of the system. Heating was stopped at the point where the temperature reached 180° C. to maintain the reaction liquid at a certain temperature. After a completion of hydrodesulfurization (about 80 minutes), the reaction was completed to obtain lithium sulfide.

(2) Purification of Lithium Sulfide

After NMP in the 500-mL slurry reaction solution (NMP-lithium sulfide slurry) obtained in the above-mentioned (1) was subjected to decantation, 100 mL of dehydrated NMP was added thereto. Then, the mixture was stirred at 105° C. for about one hour. With the temperature being maintained, NMP was subjected to decantation. Further, 100 mL of NMP was added and stirred at 105° C. for about one hour, and NMP was subjected to decantation with the temperature being maintained. The same operation was repeated 4 times in total. After the completion of the decantation, lithium sulfide was dried in a nitrogen gas stream, at 230° C. (which is a temperature equal to or higher than the boiling point of NMP), under ordinary pressure for 3 hours to obtain purified lithium sulfide. The content of impurities in the resulting lithium sulfide was measured.

The total content of sulfur oxides of lithium sulfite ($Li_2SO_3$), lithium sulfate ($Li_2SO_4$) and thiosulfuric acid dilithium salt ($Li_2S_2O_3$) and the content of N-methyl aminobutyric acid lithium salt (LMAB) were quantified by the ion chromatography. As a result, it was found that the total content of the sulfur oxides was 0.13 mass % and the content of LMAB was 0.07 mass %.

(3) Sulfide-Based Crystallized Glass (Electrolyte Particles)

$Li_2S$ and $P_2S_5$ (manufactured by Sigma-Aldrich Japan) produced above were used as the starting materials. A mixture was obtained by mixing them such that the molar ratio thereof became 70:30. About 1 g of the mixture obtained was placed in a 45 mL-alumina-made container together with 10 alumina balls each having a diameter of 10 mm. The alumina-made container was subjected to mechanical milling in nitrogen at room temperature (25° C.) at a rotation speed of 370 rpm for 20 hours by means of a planetary ball mill (P-7, manufactured by Fritsch) to obtain a lithium-phosphorus based sulfide glass solid electrolyte as white-yellow powder.

The powder (sulfide-based glass) was calcined in nitrogen from room temperature (25° C.) to 260° C., whereby sulfide-based crystallized glass (electrolyte particles) were produced. The resulting sulfide-based glass had peaks at 2θ=17.8 deg, 18.2 deg, 19.8 deg, 21.8 deg, 23.8 deg, 25.9 deg, 29.5 and 30.0 deg.

INDUSTRIAL APPLICABILITY

The electrolyte sheet or the electrolyte slurry of the invention can be preferably used for the formation of an electrolyte of a battery. The battery of the invention can be used as a power source of an apparatus of an electric automobile, or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the Japanese patent applications claiming the priority under the Paris Convention to the invention are incorporated herein by reference in its entirety.

The invention claimed is:

1. A method for producing a stacked body, the method comprising:
   applying an electrolyte slurry comprising sulfide-based solid electrolyte particles and a binder that is a resin having a structural unit A in a molecular skeleton to a base material, thereby to form an electrolyte layer; and
   transferring the electrolyte layer to an electrode material layer and peeling off the base material from the electrolyte layer,
   wherein
   the electrolyte slurry has a solid matter concentration of 20 wt % or more and 90 wt % or less;
   a ratio of the electrolyte particles in the solid matter is 90 wt % or more and 99.5 wt % or less; and
   the base material has a peel force of 20 mN/cm or more and 1500 mN/cm or less:

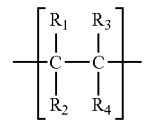

(A)

where $R_1$ to $R_4$ are independently H, F, $CF_3$, $CH_2CF_3$, $CF_2CF_3$, $CF_2CF_2CF_3$, $OCF_2CF_2CF_3$, $OCF_3$ or Cl, and at least one of $R_1$ to $R_4$ is F, $CF_3$, $CH_2CF_3$, $CF_2CF_3$, $CF_2CF_2CF_3$, $OCF_2CF_2CF_3$ or $OCF_3$.

2. The method according to claim 1, wherein the structural unit A is a structure derived from vinylidene fluoride, a structure derived from tetrafluoroethylene or a structure derived from hexafluoropropylene.

3. The method according to claim 1, wherein the electrolyte particles have an average particle diameter of 5 nm or more and 50 μm or less.

4. The method according to claim 2, wherein b in the formula (1) is 0.

5. The method according to claim 4, wherein a:c:d in the formula (1) is (1-9):(1):(3-7).

6. The method according to claim 1, wherein raw materials of the electrolyte particles are $Li_2S$ and $P_2S_5$.

7. The method according to claim 1, wherein the electrolyte particles are glass ceramics.

8. The method according to claim 2, wherein
   b in the formula (1) is 0,
   a:c:d in the formula (1) is (1-9):(1):(3-7),
   raw materials of the electrolyte particles are $Li_2S$ and $P_2S_5$, and
   the electrolyte particles are glass ceramics.

9. The method according to claim 2, wherein
   b in the formula (1) is 0,
   a:c:d in the formula (1) is (1-9):(1):(3-7),
   raw materials of the electrolyte particles are $Li_2S$ and $P_2S_5$,
   the electrolyte particles are glass ceramics, and
   the structural unit A is a structure derived from vinylidene fluoride, a structure derived from tetrafluoroethylene or a structure derived from hexafluoropropylene.

10. The method according to claim 2, wherein
    b in the formula (1) is 0,
    a:c:d in the formula (1) is (1-9):(1):(3-7),
    raw materials of the electrolyte particles are $Li_2S$ and $P_2S_5$,
    the electrolyte particles are glass ceramics,
    the structural unit A is a structure derived from vinylidene fluoride, a structure derived from tetrafluoroethylene or a structure derived from hexafluoropropylene, and
    the electrolyte particles have an average particle diameter of 5 nm or more and 50 μm of less.

11. The method according to claim 1, wherein the sulfide-based solid electrolytes have a composition represented by the formula (1):

$Li_aM_bP_cS_d$ (1)

wherein in the formula (1), M is an element selected from B, Zn, Si, Cu, Ga and Ge; and
a, b, c and d are a composition ratio of each element, and satisfy a:b:c:d of 1 to 12:0 to 0.2:1:2 to 9.

* * * * *

UNITED STATES PATENT AND TRADEMARK OFFICE
CERTIFICATE OF CORRECTION

PATENT NO. : 10,511,052 B2
APPLICATION NO. : 14/361976
DATED : December 17, 2019
INVENTOR(S) : Hitomi Adachi et al.

It is certified that error appears in the above-identified patent and that said Letters Patent is hereby corrected as shown below:

In the Claims

Columns 25 and 26, replace Claims 1 – 11 with the claims herewith:

1. A method for producing a stacked body, the method comprising:
applying an electrolyte slurry comprising sulfide-based solid_electrolyte particles and a binder that is a resin having a structural unit A in a molecular skeleton to a base material, thereby to form an electrolyte layer; and
transferring the electrolyte layer to an electrode material layer and peeling off the base material from the electrolyte layer,
wherein
the electrolyte slurry has a solid matter concentration of 20 wt% or more and 90 wt% or less; a ratio of the electrolyte particles in the solid matter is is 90 wt% or less;
a ratio of the electrolyte particles in the solid matter is 90 wt% or more and 99.5 wt% or less; and the base material has a peel force of 20 mN/cm or more and 1500 mN/cm or less

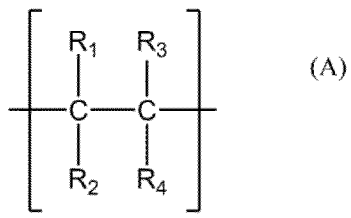

where $R_1$ to 4 are independently H, F, $CF_3$, $CH_2CF_3$, $CF_2CF_3$, $CF_2CF_2CF_3$, $OCF_2CF_2CF_3$, $OCF_3$ or Cl, and at least one of $R_1$ to $R_4$ is F, $CF_3$, $CH_2CF_3$, $CF_2CF_3$, $CF_2CF_2CF_3$, $OCF_2CF_2CF_3$ or $OCF_3$.

2. The method according to claim 1, wherein the structural unit A is a structure derived from vinylidene fluoride, a structure derived from tetrafluoroethylene or a structure derived from hexafluoropropylene.

Signed and Sealed this
Twenty-sixth Day of July, 2022

Katherine Kelly Vidal
*Director of the United States Patent and Trademark Office*

3. The method according to claim 1, wherein the electrolyte particles have an average particle diameter of 5 nm or more and 50 μm or less.

4. The method according to claim 1, wherein raw materials of the electrolyte particles are $Li_2S$ and $P_2S_5$.

5. The method according to claim 1, wherein the electrolyte particles are glass ceramics.

6. The method according to claim 1, wherein the sulfide-based solid electrolytes have a composition represented by the formula (1):

$Li_aM_bP_cS_d$(1) wherein in the formula (1), M is an element selected from B, Zn, Si, Cu, Ga and Ge;
and
a, b, c and d are a composition ratio of each element, and satisfy a;b;c;d or 1 to 12:0 to 0.2:1:2 to 9.

7. The method according to claim 6, wherein b in the formula (1) is 0.

8. The method according to claim 7, wherein a:c:d in the formula (1) is (1-9):(1) : (3-7).

9. The method according to claim 6, wherein
b in the formula (1) is 0,
a:c:d in the formula (1) is (1-9) : (1) : (3-7),
raw materials of the electrolyte particles are $Li_2S$ and $P_2S_5$, and
the electrolyte particles are glass ceramics.

10. The method according to claim 6, wherein b in the formula (1) is 0,
a:c:d in the formula (1) is (1-9) : (1) : (3-7),
raw materials of the electrolyte particles are $Li_2S$ and $P_2S_5$,
the electrolyte particles are glass ceramics, and the structural unit A is a structure derived from vinylidene fluoride, a structure derived from tetrafluoroethylene or a structure derived from hexafluoropropylene.

11. The method according to claim 6, wherein b in the formula (1) is 0, a:c:d in the formula (1) is (1-9):(1):(3-7), raw materials of the electrolyte particles are $Li_2S$ and $P_2S_5$, the electrolyte particles are glass ceramics, the structural unit A is a structure derived from vinylidene fluoride, a structure derived from tetrafluoroethylene or a structure derived from hexafluoropropylene, and the electrolyte particles have an average particle diameter of 5 nm or more and 50 μm of less.